US008588088B2

(12) United States Patent
Sinha

(10) Patent No.: US 8,588,088 B2
(45) Date of Patent: Nov. 19, 2013

(54) CONTENT BASED VLAN CLASSIFICATION AND FRAMEWORK FOR ETHERNET NETWORK TO SUPPORT CONTENT BASED BRIDGING

(75) Inventor: Abhishek Sinha, Woodland Hills, CA (US)

(73) Assignee: Alcatel Lucent, Paris (FR)

( * ) Notice: Subject to any disclaimer, the term of this patent is extended or adjusted under 35 U.S.C. 154(b) by 360 days.

(21) Appl. No.: 12/925,862

(22) Filed: Nov. 1, 2010

(65) Prior Publication Data
US 2012/0106546 A1 May 3, 2012

(51) Int. Cl.
*H04L 12/28* (2006.01)
*H04J 1/16* (2006.01)

(52) U.S. Cl.
USPC ........... 370/252; 370/230; 370/235; 370/338; 370/389

(58) Field of Classification Search
USPC .......................... 370/252, 230, 235, 338, 389
See application file for complete search history.

(56) References Cited

U.S. PATENT DOCUMENTS

| 6,061,334 A | * | 5/2000 | Berlovitch et al. | 370/255 |
| 7,990,994 B1 | * | 8/2011 | Yeh et al. | 370/431 |
| 2004/0128695 A1 | | 7/2004 | Shin | |
| 2008/0219268 A1 | * | 9/2008 | Dennison | 370/395.2 |

FOREIGN PATENT DOCUMENTS

| EP | 1017199 A1 | 7/2000 |
| EP | 1670187 A1 | 6/2006 |

OTHER PUBLICATIONS

International Search Report; International Publication No. PCT/US2011/057791; dated Jan. 30, 2012, 9 pages.

* cited by examiner

*Primary Examiner* — John Pezzlo
(74) *Attorney, Agent, or Firm* — Garlick & Markison

(57) ABSTRACT

The preferred methodology for classifying VLANs based on the content of a packet arriving at the edge switch involves receiving a policy that defines content based classification of VLANs for packets from a network management station; assigning a VLAN to the packet received from a node based on inspection of a content of the packet and the policy received from the network management station; and sending the packet with the assigned VLAN to other nodes in the network for operations based on the assigned VLAN.

17 Claims, 8 Drawing Sheets

CONTENT BASED VLAN CLASSIFICATION AND FRAMEWORK FOR ETHERNET NETWORK TO SUPPORT CONTENT BASED BRIDGING

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to the telecommunications industry. The invention discussed herein is in the general classification of devices and methodology for classifying traffic to a Virtual Local Area Network (VLAN) based on the content of the traffic and constructing a framework for a network based on content based bridging of traffic.

BACKGROUND

This section introduces aspects that may be helpful in facilitating a better understanding of the invention. Accordingly, the statements of this section are to be read in this light and are not to be understood as admissions about what is in the prior art or what is not in the prior art.

Several technical terms and/or phrases will be used throughout this application and merit a brief explanation.

A Virtual Local Area Network (VLAN) is a group of clients that communicate as if they were connected irrespective of their actual geographical location. VLANs are like LANs but do not require VLAN members to be located on the same network switch.

A VLAN tag is an Institute of Electrical and Electronics Engineers (IEEE) 802.1Q tag inserted into a data frame or packet which includes a tag protocol identifier (TPI), a priority code point (PCP), a canonical format indicator (CFI) and a VLAN identifier (VID). The VID specifies the VLAN to which the frame belongs.

Internet Protocol (IP) multicast utilizes multicast addressing to allow IP packets to be sent to a group of receivers in a single transmission rather than unicasting from the source to each receiver individually.

An access control list (ACL) is a list that specifies which users are permitted access to objects and what operations are allowed on given objects.

Quality of Service (QoS) refers to a mechanism to control resources in a packet-switched telecommunications network and not to the achieved service quality. Quality of Service allows different priority to be given to different data flows from different users to guarantee a certain level of performance to a data flow from a given user.

Bridging permits packets to be forwarded over the Internet and relies on inspection of source addresses in received packet headers and broadcasting to locate devices in the network. A table is used to store the MAC addresses of located devices for further use when packets are received.

A Service Level Agreement (SLA) is a portion of a service contract in which the level of service is formally defined between a customer and a service provider.

File Transfer Protocol (FTP) is a network protocol for copying a file from one host to another over the Internet.

Hypertext Transfer Protocol (HTTP) is a network protocol that is the foundation for the World Wide Web. A computer submits a HTTP request to a server hosting a website and storing content such as HyperText Markup Language (HTML) files.

Secure Sockets Layer (SSL) is a network protocol for providing security over the Internet.

User Datagram Protocol (UDP) is a network protocol that allows computer programs to send datagrams to other hosts on the network without setting up a predetermined data path.

Transmission Control Protocol (TCP) is a network protocol that permits more reliable delivery of data packets than UDP from one computer to another computer.

Real-Time Transport Protocol (RTP) is a network protocol for delivering audio and video over the Internet.

A Uniform Resource Identifier (URI) is a string of characters for identifying a name or resource on the Internet.

A Uniform Resource Locator (URL) is a URI that identifies where a resource is available and how to access the resource.

A Network Management System (NMS) involves both hardware and software used for managing a network.

A bridge and a switch are devices used in a network to connect other network segments. A switch has numerous ports compared to a bridge.

A router is a device that connects two or more networks and permits data to be exchanged between the networks.

A residential gateway is a device used to connect devices in the home to the Internet and may include a modem, a switch and a router. A gateway router is a router that serves as an access point to another network.

Network devices traditionally classify received traffic into VLAN based traffic using the following classification methods: (1) port based VLAN or default VLAN assignment (for untagged traffic); (2) assignment based on the VLAN ID stored in the VLAN tag of the packet (for tagged traffic); (3) protocol based VLAN assignment; and (4) IP subnet based VLAN assignment.

These VLAN classification methods are based on fixed policies. All customer traffic, regardless of the content of the traffic, gets classified based on these policies. The traditional Ethernet network then sets up the bridging rules to setup the topology path for the customer traffic. In the Ethernet cloud, all the decisions related to Layer 2 switching, security and QoS are based on the VLAN that has been assigned to the traffic on the ingress enterprise switches.

The edge switches classify the packets/traffic based on the aforementioned VLAN classification techniques. No further sub-classification of the customer traffic based on the content of the traffic occurs. Thus, the FTP traffic, HTTP traffic to server X, HTTP traffic to server Y and voice traffic or video traffic might all be classified in the same VLAN. All the customer traffic is then switched through the customer network based on the VLAN classification performed on the edge switch.

Network administrator equipment might have the capability to use ACLs to apply QoS and security policies independently of the traffic flows, but these policies have to be distributed uniformly to all the edge switches and to some extent to the core switches, creating increased administrative overhead for the network administrator. Any change in user policies involves administrative work to create differential behavior to the traffic flows which are subscribing to a specific content.

The user traffic is often a mix of different traffic flows (e.g. FTP, HTTP, IP multicast and RTP). Even within the HTTP traffic, the content might be destined to different routing gateways thus requiring different bridging and QoS policies in the Ethernet cloud.

Current network solutions do not classify traffic into VLANs based on the content of the traffic. The network administrator does not have a mechanism to look deep into the packet and sub-classify the traffic (which can be destined to the same destination) into separate VLANs.

Hence, there is a need for devices and methodology that efficiently, reliably and affordably permits classifying traffic to a Virtual Local Area Network (VLAN) based on the content of the traffic and constructing a framework for a network based on content based bridging of traffic.

SUMMARY OF THE DISCLOSURE

With the proposed solution, a network administrator is able to classify the customer traffic into different VLANs based on the content of the traffic. Based on this VLAN classification, the network administrator is able to classify, control and manage the QoS policies that can be applied to each of the sub-flows within the customer traffic; apply different security profiles to the different sub-flows within the customer traffic; enforce a different bridging behavior for each of the sub-flows; and institute different billing policies and SLA compliance for the sub-flows.

Content or sub-flow may, for example, relate to the attributes of the packets for classifying the packets as adhering to a single end application or to an end application and/or destination network element servicing a single end application.

The preferred device (edge switch) includes a memory containing a set of instructions, a processor for processing at least some of the set of instructions and a packet processor or switching application-specific integrated circuit (ASIC) that acts on/processes at least some of the set of instructions provided to it by the processor. The set of instructions include instructions for receiving a policy defining assignment of VLANs for designated content of packets from a network management station. The set of instructions may also include instructions for storing the policy at a policy database/data repository and for retrieving the policy from the policy database/data repository.

The set of instructions further include instructions for assigning a VLAN to a packet received from a node based on inspection of the content of the packet and the policy received from the network management station and instructions for sending the packet with the assigned VLAN through other nodes in the network for operations based on the assigned VLAN. The instructions for assigning a VLAN to a packet received from a node based on inspection of the content of the packet and the policy received from the network management station and the instructions for sending the packet with the assigned VLAN through other nodes in the network for operations based on the assigned VLAN may be sent from the processor to the packet processor/ASIC for processing/implementation of these instructions. Assigning a VLAN to a packet received from a node based on inspection of the content of the packet and the policy received from the network management station may involve inserting a VLAN tag with a VLAN ID into the packet at the packet processor or ASIC.

The preferred device (network management station) includes a memory containing a set of instructions and a processor for processing the set of instructions. The set of instructions include instructions for sending a policy that defines content based classification of VLANs for packets from the network management station. The set of instructions may further include instructions for creating the policy that defines content based classification of VLANs for packets.

The preferred methodology for classifying VLANs based on the content of a packet arriving at an edge node (e.g. edge switch) involves receiving a policy that defines content based classification of VLANs for packets from a network management station; assigning a VLAN to the packet received from a node based on inspection of a content of the packet and the policy received from the network management station; and sending the packet with the assigned VLAN to other nodes in the network for operations based on the assigned VLAN.

The preferred methodology of managing a network at a management station involves sending a policy that defines content based classification of VLANs for packets to an edge node (e.g. edge switch) and a network administrator creating/selecting the policy at the management station in which VLANs are classified based on a content of packets to provide one of a different QoS, different bridging through the network and different security measures to certain packets.

Under some applications, embodiments may provide a method that is relatively inexpensive to implement that permits classifying traffic to a Virtual Local Area Network (VLAN) based on the content of the traffic and constructing a framework for a network based on content based bridging of traffic.

Under some applications, embodiments may provide a device and method that are not operationally complex that permit classifying traffic to a Virtual Local Area Network (VLAN) based on the content of the traffic and constructing a framework for a network based on content based bridging of traffic.

Under some applications, embodiments may provide a device and method that efficiently permit classifying traffic to a Virtual Local Area Network (VLAN) based on the content of the traffic and constructing a framework for a network based on content based bridging of traffic.

Under some applications, embodiments may provide a reliable device and method that permit classifying traffic to a Virtual Local Area Network (VLAN) based on the content of the traffic and constructing a framework for a network based on content based bridging of traffic.

Under some applications, embodiments may provide a device and system that are relatively inexpensive to manufacture and deploy that permit classifying traffic to a Virtual Local Area Network (VLAN) based on the content of the traffic and constructing a framework for a network based on content based bridging of traffic.

Under some applications, embodiments may provide better control to the network administrator to design networks for providing differential behavior to customer traffic based on the content of the traffic.

Under some applications, embodiments may provide more granular control of the VLAN classification of the packet that is more indicative of the actual traffic pattern generated by the customer, giving the network administrator better control for handling the different sub-flows within the customer traffic.

BRIEF DESCRIPTION OF THE DRAWINGS

Some embodiments of apparatus and/or methods of the present invention are now described, by way of example only, and with reference to the accompanying drawings, in which.

DETAILED DESCRIPTION OF THE DRAWINGS

The preferred embodiment of the present disclosure relates to an Ethernet network in which the network administrator is able to classify the traffic into segregated VLANs based on the content of the traffic. Using these VLANs, network policies can be easily applied in the whole of the Ethernet network to control the bridging, QoS or security policies applicable for a particular traffic flow.

The preferred embodiment of the present disclosure involves: distribution of the policy to the edge switches from a network management station to support content based VLAN classification; VLAN classification/assignment in the edge switches based on inspection of the content of the customer traffic and the received policy; and performance of policy actions in the Ethernet cloud to provide differentiated services (e.g. bridging, QoS, security) based on the VLAN of the customer traffic.

Figure 1:
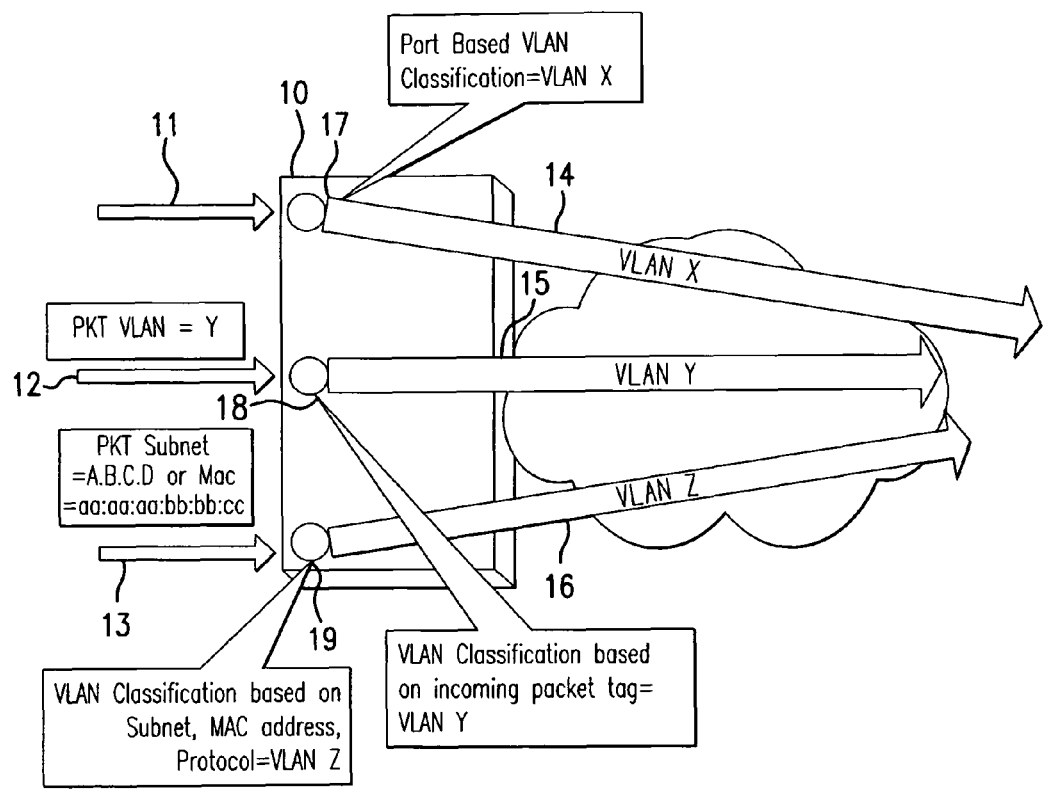
FIG. 1 depicts several current VLAN classification methods performed at an edge switch.

FIG. 1 depicts several VLAN classification methods performed at an edge switch. The edge switch 10 classifies received packets/traffic 11, 12 and 13 into VLAN based traffic 14, 15 and 16 using the following classification methods: (1) port based VLAN or default VLAN assignment (for untagged traffic) 17; (2) assignment based on the VLAN ID stored in the VLAN tag of the packet (for tagged traffic) 18; (3) protocol based VLAN assignment and IP subnet based VLAN assignment 19.

Traditional VLAN classification techniques classify the packets based on policies which are not adaptive to the different traffic flows being generated by the end customer. The traffic generated by the customer premises equipment (CPE) is frequently a mix of data, video and telephony. Even within the data traffic, there is often a mix of different data flows (e.g. FTP and HTTP) and some of the data flows (e.g. HTTP traffic) are destined to different gateways on the enterprise edge.

Figure 2:
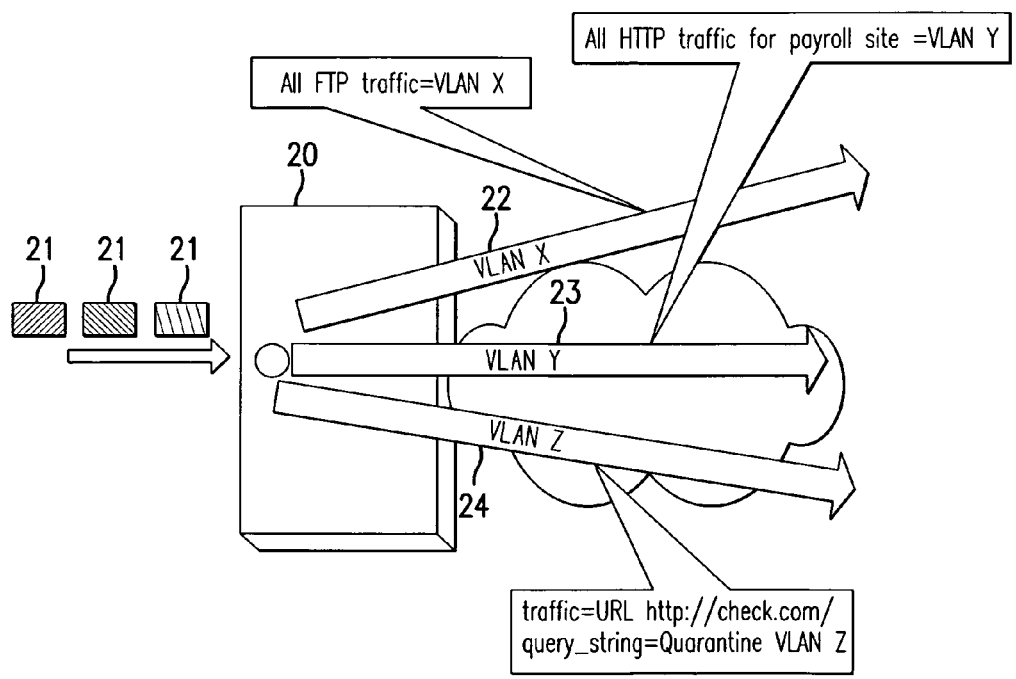
FIG. 2 depicts the preferred embodiment of the VLAN classification method utilizing the content of a packet performed at an edge switch.

FIG. 2 depicts the preferred embodiment of the VLAN classification method utilizing the content of a packet performed at an edge switch. Data packets or traffic 21 are received at edge switch 20. The edge switch 20 classifies received traffic 21 into VLAN based traffic 22, 23 and 24 based on the content of the traffic. VLAN X contains all FTP traffic. VLAN Y contains all HTTP traffic for a certain payroll site. VLAN Z contains all traffic with URL http://check.com/query_string.

FIG. 2 only depicts one scenario for VLAN classification based on the content of packets. Content based VLAN classification can be based on at least the following content/attributes of the packets: TCP/UDP port information; RTP header information; HTTP content; the web host specification; the Universal Resource Identifier (URI) field; and the routing protocol.

The edge switch 20 needs to support the capability to perform deep packet inspection/classification. Typically, the network administrator will configure static as well as adaptive policies to assign the packets into different VLANs. A policy that defines content based classification of VLANs for packets is a policy that defines what content (e.g. URL http://check.com/query_string) within a packet causes the packet to be assigned to a given VLAN (e.g. VLAN Z). The edge switch 20 performs deep packet inspection based on the policy received from the network administrator and assigns incoming packets to the given VLAN depending on whether the received packet has the attribute/content required for assignment to a given VLAN as defined in the policy. The packet is then switched according to the assigned VLAN as it flows through the remainder of the Ethernet network.

Figure 3:
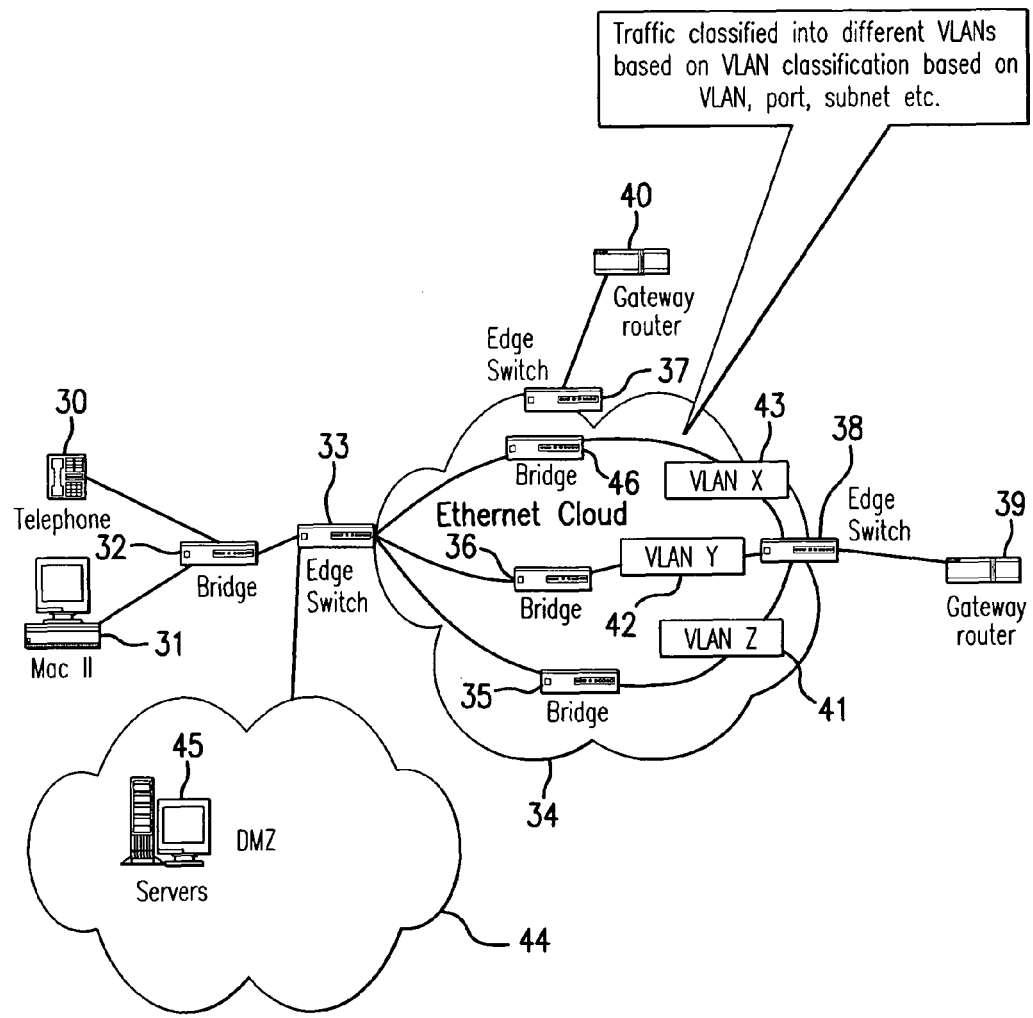
FIG. 3 depicts a typical Enterprise network.

FIG. 3 depicts a typical Enterprise network. A telephone 30 and computer 31 connect to a bridge 32. The bridge 32 connects to an edge switch 33. The edge switch 33 also connects to a demilitarized zone 44 (DMZ) containing servers 45. The edge switch 33 allows traffic from the servers 45, telephone 30 and computer 31 to enter the Ethernet cloud 34. The Ethernet cloud 34 contains bridges 35, 36 and 46 for handling the traffic.

The edge switches 33, 37 and 38 classify the packets/traffic based on the traditional VLAN classification techniques. No further sub-classification of the customer traffic based on the content of the traffic occurs. Thus, the FTP traffic, HTTP traffic to a first server, HTTP traffic to a second server and voice traffic and/or video traffic might all be classified in the same VLAN. All the customer traffic is then switched through the customer network based on the VLAN classification performed on the edge switches 33, 37 and 38.

In this example, traffic assigned to VLAN X 43 is sent through bridge 46 while traffic assigned to VLAN Y 42 is sent through bridge 36 and traffic assigned to VLAN Z 41 is sent through bridge 35. All of the traffic then is sent to edge switch 38 and onto gateway router 39. None of the traffic in this example is sent to edge switch 37 and onto gateway router 40.

Figure 4:
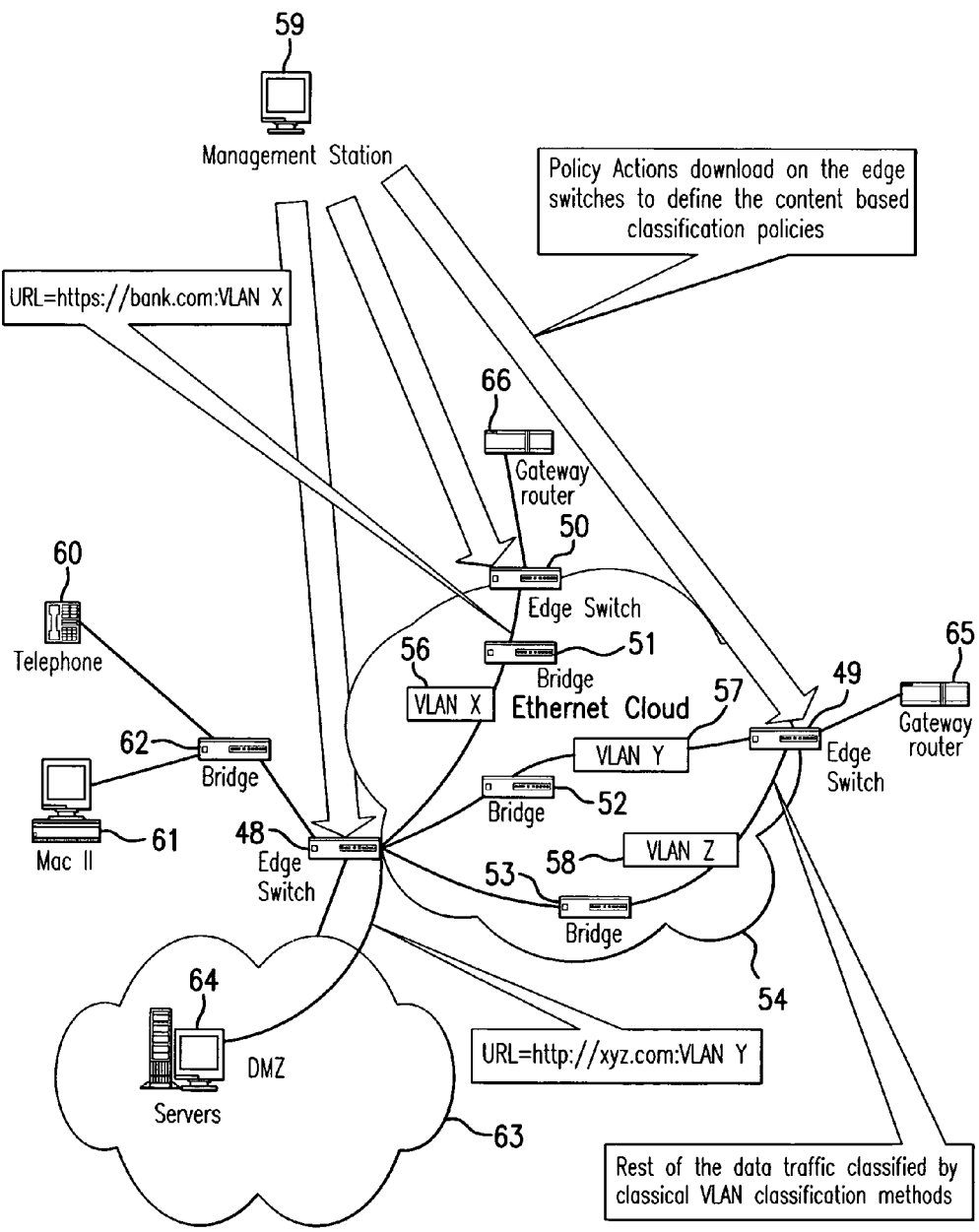
FIG. 4 depicts the preferred embodiment of an Ethernet network utilizing the preferred VLAN classification involving content of a packet.

FIG. 4 depicts the preferred embodiment of an Ethernet network utilizing the preferred VLAN classification involving content of a packet. A telephone 60 and computer 61 connect to a bridge 62. The bridge 62 connects to an edge switch 48. The edge switch 48 also connects to a demilitarized zone 63 (DMZ) containing servers 64. The edge switch 48 allows traffic from the servers 64, telephone 60 and computer 61 to enter the Ethernet cloud 54. The Ethernet cloud 54 contains bridges 51, 52 and 53 for handling the traffic.

In this example, HTTP traffic for URL=https://bank.com is assigned to VLAN X and sent through edge switch 48 to bridge 51 and onto edge switch 50 and gateway router 66. HTTP traffic for URL=http://xyz.com is assigned to VLAN Y and is sent through edge switch 48 to bridge 52 and onto edge switch 49 and onto gateway router 65. All other data traffic is classified using traditional VLAN classification methods into VLAN Z and sent from edge switch 48 to bridge 53 and onto edge switch 49 and gateway router 65.

VLAN classification and assignment is completed at the edge switches 48, 49 and 50 as described in conjunction with FIG. 2. Then, management of the VLANs in the Ethernet cloud 54 at bridges 51, 52 and 53 is easily accomplished to provide differentiated service based on the content of the traffic using the assigned VLAN.

The bridges 51, 52 and 53 in the core of the Ethernet cloud 54 need not be aware of the content or the basis on which the VLAN classification has happened on the edge switches 48, 49 and 50.

As illustrated in FIG. 4, by classifying the traffic into different VLANs based on the content as described in FIG. 2, the network administrator can control sub-flows within the customer traffic. HTTP traffic destined to a local bank and assigned to VLAN X 56 can be routed to a different gateway router 66 as compared to the rest of the customer traffic. Similarly, all customer traffic destined to URL=http://xyz.com can be segregated for accounting purpose into VLAN Y 57. The remaining traffic can be classified onto VLAN Z 58 using traditional VLAN classification methods.

The network administrator may use the normal networking policies to provide differentiated behavior to different VLANs. This ensures that the network administrator controls and manages different sub-flows of the customer traffic. For example, the network administrator may provide a differential behavior to customer traffic destined to a partner search engine. By way of further example, the network administrator may downgrade or quarantine traffic from a given customer who is using a disproportionate number of file-sharing applications.

FIG. 4 also shows the distribution of the policy actions to the edge switches from the network management station 59. A NMS application controls the distribution of the VLAN classification policies to the edge switches 48, 49 and 50 where they are downloaded to define the content based classification policies. The policies can be static policies or adaptive polices based on the customer SLA.

The system depicted in FIG. 4 provides more granular control on the VLAN classification of a packet. This classification is more indicative of the actual traffic pattern generated by the customer, giving the network administrator better control for handling the different sub-flows within the customer traffic. After the traffic has been classified into a different VLAN, each of the sub-flows can have an independent security, QoS and bridging profile in the network. For example, the network administrator can give higher priority to the SSL traffic going to America Online (AOL) servers, or can quarantine all the traffic destined from an office to a sports site into a separate VLAN for accounting.

The system and methodology depicted in FIG. 4 provide better control to the network administrator to design networks for providing differential behavior to customer traffic based on the content of the traffic. Because end customer applications are increasing exponentially, it is desirable for the network administrator to provide a differentiated SLA to the customer based on the content of the traffic.

Figure 5:
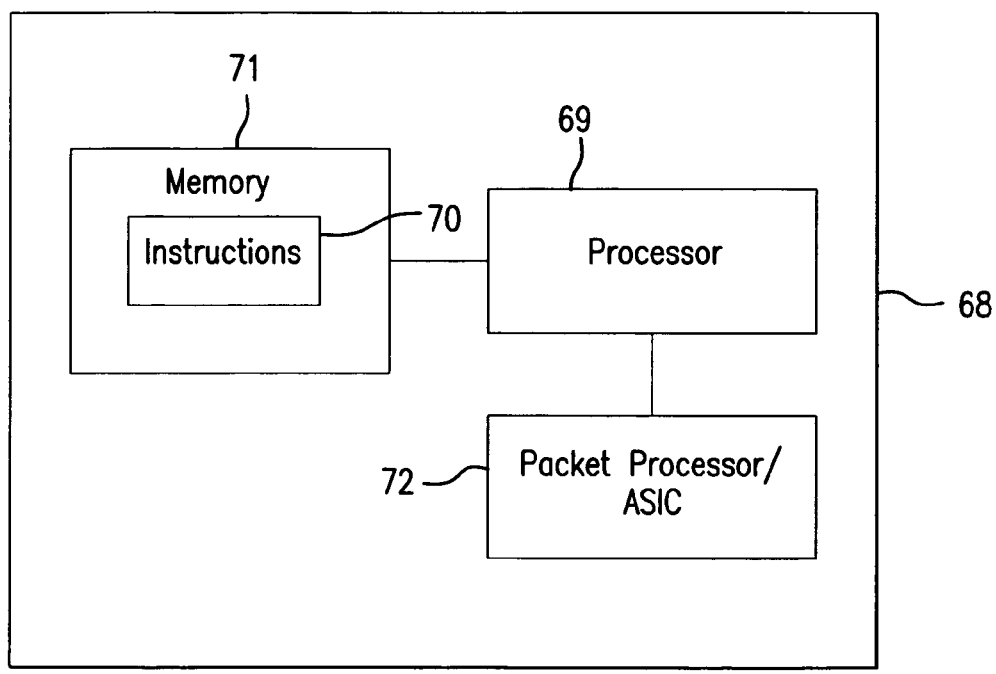
FIG. 5 depicts the preferred embodiment of the edge switch.

FIG. 5 depicts the preferred embodiment of the edge switch. The edge switch 68 includes a memory 71 containing a set of instructions 70, a processor 69 for processing at least some of the set of instructions 70 and a packet processor or switching application-specific integrated circuit (ASIC) 72 that implements/processes at least some of the set of instructions provided to it by the processor 69. The set of instructions 70 include instructions for receiving a policy defining assignment of VLANs for designated content of packets from a network management station. The set of instructions 70 may also include instructions for storing the policy at a policy database/data repository and for retrieving the policy from the policy database/data repository.

The set of instructions 70 further include instructions for assigning a VLAN to a packet received from a node based on inspection of the content of the packet and the policy received from the network management station and instructions for sending the packet with the assigned VLAN through other nodes in the network for operations based on the assigned VLAN. The instructions for assigning a VLAN to a packet received from a node based on inspection of the content of the packet and the policy received from the network management station and the instructions for sending the packet with the assigned VLAN through other nodes in the network for operations based on the assigned VLAN may be sent from the processor 69 to the packet processor/ASIC 72 for processing/implementation of these instructions. Assigning a VLAN to a packet received from a node based on inspection of the content of the packet and the policy received from the network management station may involve inserting a VLAN tag with a VLAN ID into the packet at the packet processor 72.

Figure 6:
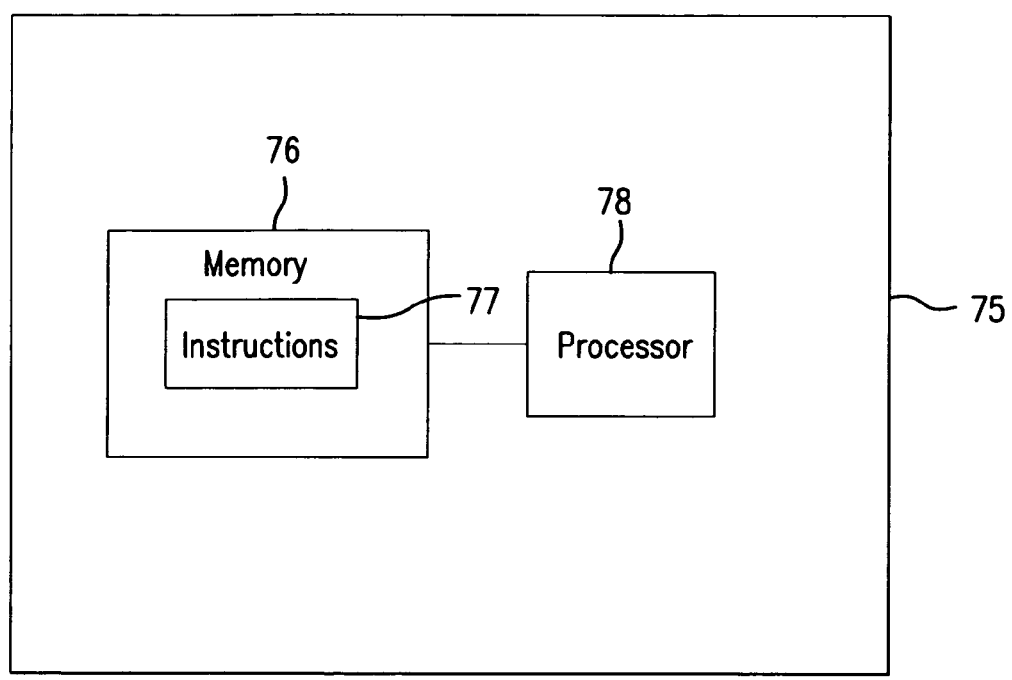
FIG. 6 depicts the preferred embodiment of the management station.

FIG. 6 depicts the preferred embodiment of the network management station. The network management station 75 includes a memory 76 containing a set of instructions 77 and a processor 78 for processing the set of instructions 77. The set of instructions 77 include instructions for sending a policy that defines content based classification of VLANs for packets from the network management station. The set of instructions may further include instructions for creating the policy that defines content based classification of VLANs for packets. By way of example, the set of instructions for creating the policy that defines content based classification of VLANs for packets may include instructions for classifying a VLAN for packets based on at least one of a TCP/UDP port assignment; RTP header information; HTTP content; a web host specification, a Universal Resource Identifier (URI) field; and a routing protocol.

Figure 7:
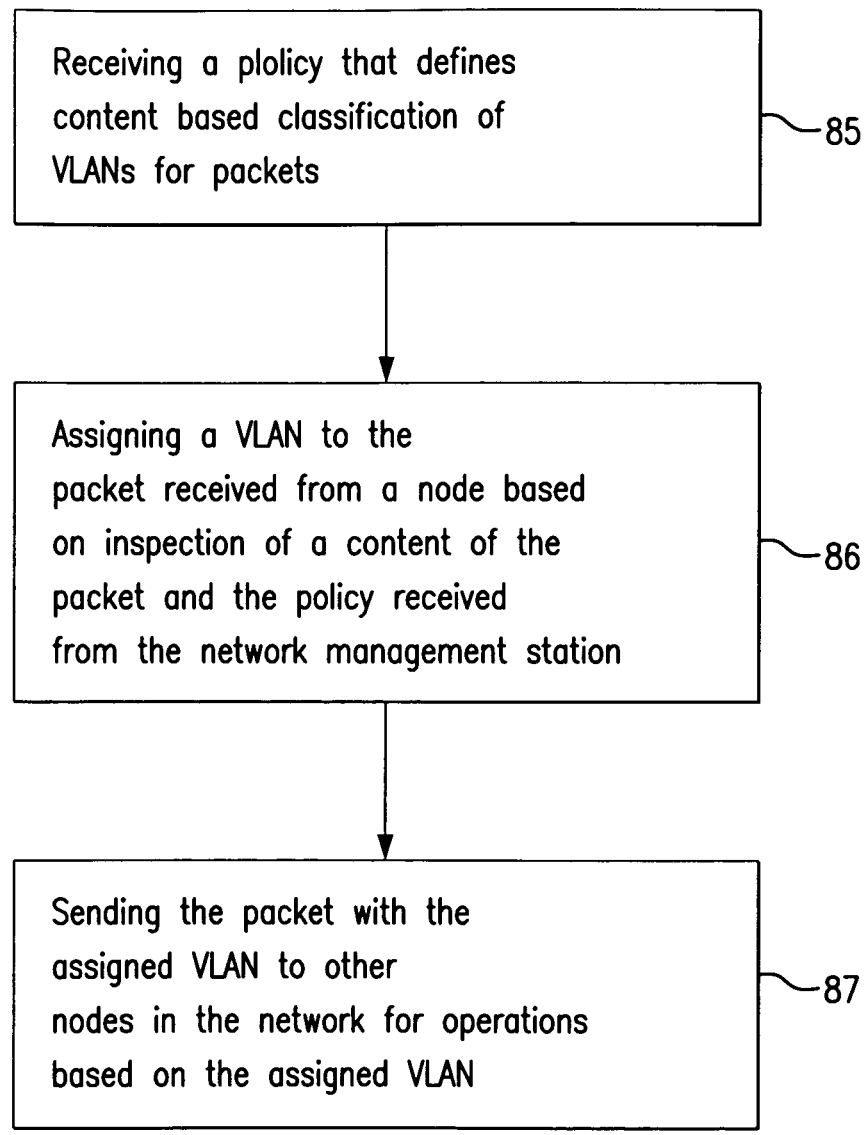
FIG. 7 depicts the preferred methodology for classifying VLANs based on the content of traffic arriving at the edge switch.

FIG. 7 depicts the preferred methodology for classifying VLANs based on the content of a packet arriving at the edge switch. At the edge switch, an operation is performed for receiving a policy that defines content based classification of VLANs for packets from a network management station 85. An operation is then performed for assigning a VLAN to the packet received from a node based on inspection of a content of the packet and the policy received from the network management station 86. An operation is then performed for sending the packet with the assigned VLAN to other nodes in the network for operations based on the assigned VLAN 87.

Figure 8:
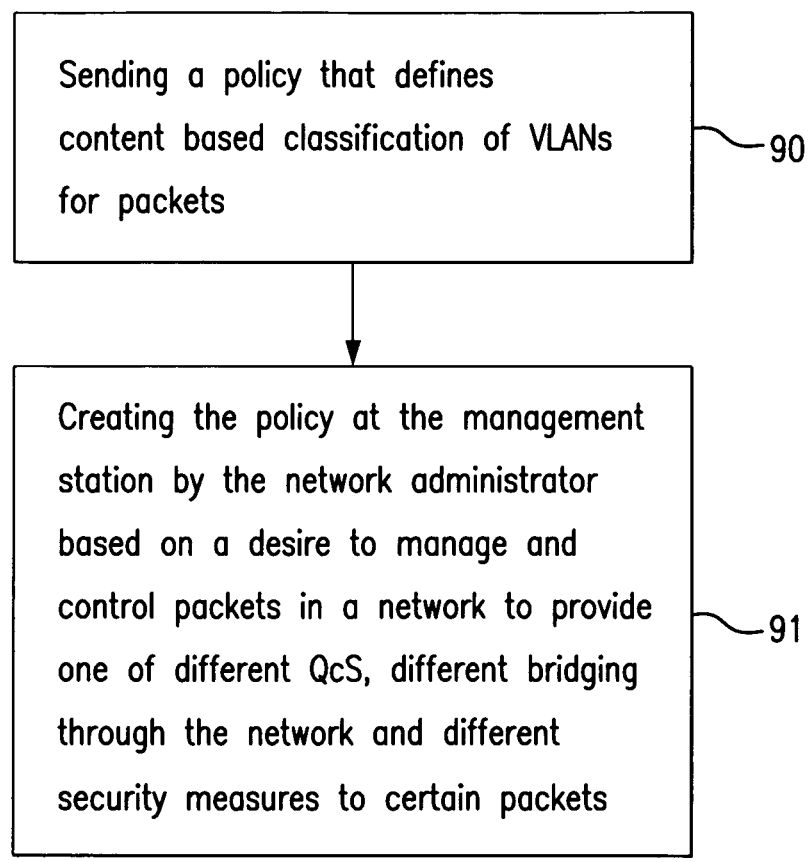
FIG. 8 depicts the preferred methodology of managing a network at a management station.

FIG. 8 depicts the preferred embodiment of managing a network at a management station. At the management station, an operation is performed for sending a policy that defines content based classification of VLANs for packets 90. Creation of the policy may involve classifying a VLAN based on at least one of a TCP/UDP port assignment; RTP header information; HTTP content; a web host specification; a Universal Resource Identifier (URI) field; and a routing protocol. An operation may also be performed for creating or selecting the policy at the management station by the network administrator based on a desire to manage and control packets in a network to provide one of a different QoS, different bridging through the network and different security measures to certain packets 91.

It is contemplated that the method described herein can be implemented as software, including a computer-readable medium having program instructions executing on a computer, hardware, firmware, or a combination thereof. The method described herein also may be implemented in various combinations on hardware and/or software.

A person of skill in the art would readily recognize that steps of the various above-described methods can be performed by programmed computers and the order of the steps is not necessarily critical. Herein, some embodiments are intended to cover program storage devices, e.g., digital data storage media, which are machine or computer readable and encode machine-executable or computer executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

It will be recognized by those skilled in the art that changes or modifications may be made to the above-described embodiments without departing from the broad inventive concepts of the invention. It should therefore be understood that this invention is not limited to the particular embodiments described herein, but is of the invention as set forth in the claims.

What is claimed is:

1. A device in a network comprising:
a memory containing a set of instructions; and
a processor for processing at least some of the set of instructions and a packet processor that processes at least some of the set of instructions sent to the packet processor from the processor wherein the set of instructions include instructions for receiving a policy defining assignment of VLANs for designated content of packets from a network management station and instructions for assigning a VLAN to a packet received from a node based on inspection of a content of the packet and the policy defining assignment of VLANs for designated content of packets.

2. The device of claim 1 wherein the instructions for assigning the VLAN to the packet received from the node based on inspection of the content of the packet and the policy defining assignment of VLANs for designated content of packets is sent from the processor to the packet processor and processed by the packet processor.

3. The device of claim 2 wherein assigning the VLAN to the packet received from the node based on inspection of the content of the packet and the policy received from the network management station involves inserting a VLAN tag with a VLAN ID into the packet at the packet processor.

4. The device of claim 1 wherein the set of instructions further include instructions for storing the policy at a policy data repository and instructions for retrieving the policy from the policy data repository.

5. The device of claim 1 wherein the set of instructions further include instructions for sending the packet with an assigned VLAN to another node in the network for operations based on the assigned VLAN.

6. The device of claim 5 wherein the set of instructions for sending the packet with the assigned VLAN to another node in the network for operations based on the assigned VLAN is sent from the processor to the packet processor and processed by the packet processor.

7. The device of claim 1 wherein the content is one of a TCP/UDP port assignment, RTP header information, HTTP content, a web host specification, a Universal Resource Identifier (URI) field, and a routing protocol.

8. A device in a network comprising:
at least one memory; and
at least one processor operable to:
receive a policy that defines assignment of VLANs for designated content of packets; and
assign a VLAN to a packet based on inspection of a content of the packet and the policy.

9. The device of claim 8 wherein the policy is received from a network management station.

10. The device of claim 9 wherein the policy includes classifying a VLAN for packets based on one of TCP/UDP port assignment, RTP header information, HTTP content, a web host specification, a Universal Resource Identifier (URI) field, and a routing protocol.

11. A method of managing a network at a management station comprising the steps of:
creating a policy at the management station in which VLANs are classified based on a content of packets for providing different Quality of Service (QoS) to packets; and
sending the policy to an edge node.

12. The method of claim 11 wherein the content is one of a TCP/UDP port assignment, RTP header information, HTTP content, a web host specification, a Universal Resource Identifier (URI) field, and a routing protocol.

13. The method of claim 11 wherein creating the policy at the management station is performed by a network administrator.

14. The method of claim 11 wherein creating the policy at the management station is performed by a network administrator for the purpose of providing different bridging through the network for certain packets.

15. A method of managing a network at a management station comprising the steps of:
generating a policy at the management station in which VLANs are classified based on a content of packets, wherein the policy provides for different security measures to certain packets; and
sending the policy to an edge node.

16. The method of claim 15 wherein the edge node is an edge switch.

17. The method of claim 15, wherein the content includes at least one of: a TCP/UDP port assignment, RTP header information, HTTP content, a web host specification, a Universal Resource Identifier (URI) field, and a routing protocol.

* * * * *